Patented Apr. 10, 1934

1,954,377

UNITED STATES PATENT OFFICE 1,954,377

METHOD OF INHIBITING THE DETERIORATION OF RUBBER

William S. Calcott and William A. Douglass, Penns Grove, N. J., assignors to E. I. du Pont de Nemours & Company, Wilmington, Del., a corporation of Delaware No Drawing. Application September 27, 1929, Serial No. 395,740

38 Claims. (Cl. 18—50)

This invention relates to a method of treating rubber and to the resulting rubber product and is more particularly concerned with a method of treatment whereby a rubber product is obtained which is unusually resistant to deterioration.

It is generally accepted that the rate of deterioration of rubber articles differs greatly depending on various factors, such as the composition of the stock, the form of the article, and the conditions under which it is used.

The primary object of this invention is to provide a method for retarding the deterioration of rubber by the incorporation with the rubber of a class of compounds, which not only may be easily and economically prepared from readily available materials, but which at the same time do not retard the cure.

With these objects in view, it has now been discovered that the diamino-diaryl-alkanes may be added to a rubber mix without materially affecting the rate of cure and that the resulting rubber product when vulcanized has much greater resistance to deterioration than rubber containing no anti-aging compound. These compounds have the general formula:

A—R—Z—R'—A' wherein A and A' represent amino groups or alkyl or dialkyl substituted amino groups, R and R' represent aryl groups which may or may not contain substituents such as hydroxy, alkyl and alkoxy groups, and Z represents a bivalent aliphatic radical which may or may not contain aryl substituents. Many of these compounds may be indicated by the more specific general formula:

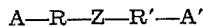

wherein X and Y may represent either hydrogen or an alkyl or aryl hydrocarbon substituent.

In order to disclose the invention in detail, the following examples of actual embodiments thereof are presented. It should be understood, however, that these examples are furnished purely for purposes of illustration and that it is not the intention that the invention be limited to the particular reagents, proportions, or other conditions therein specified.

Example 1

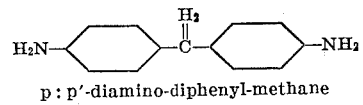

p: p'-diamino-diphenyl-methane

Two stocks were made up of the following composition. The proportions given are by weight:

|  | A | B |
|---|---|---|
| Smoked sheets | 100 | 100 |
| Sulfur | 2.75 | 2.75 |
| Zinc oxide | 18.15 | 18.15 |
| Di-ortho-tolyl-guanidine | .5626 | .5625 |
| p:p'-diamino-diphenyl-methane | 0.0 | 1.0 |

The two stocks were then cured under 40 lb. steam pressure for 40 minutes and thereupon aged in any oxygen bomb at 70° C. at 300 lb. oxygen pressure. The time required for complete deterioration was for stock A, 3 days, and for stock B, 16 days. It will be noted that the resistance to deterioration of the stock containing an antioxidant is 433% greater than that of the stock containing no antioxidant.

The same cured stocks were aged in the oxygen bomb at 70° C., and the deterioration followed by noting the changes in tensile strength. The following results were obtained.

| Stock A=3300 lb. original | | | | Stock B=3475 lb. original | | | |
|---|---|---|---|---|---|---|---|
| 1 da. | 2 da. | 3 da. | 4 da. | 1 da. | 2 da. | 3 da. | 4 da. |
| 1825 | 800 | 175 | — | 2900 | 2225 | 2100 | 1850 |

The effectiveness of this antioxidant in retarding the deterioration, as shown by changes in tensile strength, is particularly marked in the test given above.

Example 2

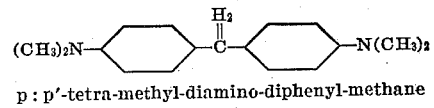

p: p'-tetra-methyl-diamino-diphenyl-methane

This material was tested in the same type of stock and cured the same period of time as given above in Example 1. Stock A which contains no antioxidant was completely deteriorated in 3 days, while stock B which contained 1% of the antioxidant was completely deteriorated in 12 days. The resistance to deterioration of the stock containing the antioxidant is, therefore, 300% greater than the stock containing no antioxidant.

*Example 3*

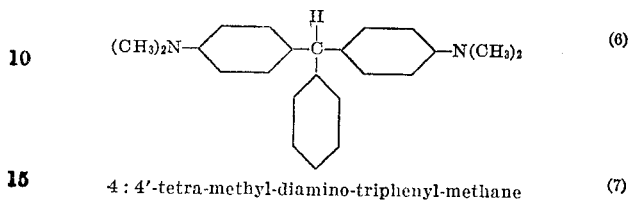

4 : 4'-tetra-methyl-diamino-triphenyl-methane

This antioxidant was tested in the same type of stock as given in the two examples above. The control was completely deteriorated in 5 days, while the sample containing one part of this antioxidant was not completely deteriorated at the end of 16 days when the test was discontinued.

*Example 4*

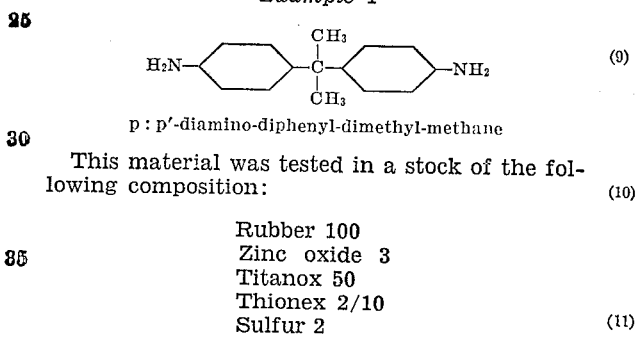

p : p'-diamino-diphenyl-dimethyl-methane

This material was tested in a stock of the following composition:

Rubber 100
Zinc oxide 3
Titanox 50
Thionex 2/10
Sulfur 2

The stocks were cured for 20 minutes at 20 lb. steam pressure, the time required for complete deterioration of the control was 6 days, while the sample containing 1% of this antioxidant required 13 days for complete deterioration.

Titanox is a pigment containing approximately 75% barium sulfate and 25% titanium oxide. (Gardner, "Chemical Synonyms and Trade Names", p. 250).

It will be obvious from the above examples that many other compounds of the type indicated may be employed in place of those illustrated in the examples. Among such compounds which exhibit similar anti-aging properties may be mentioned for purposes of illustration the following:

(1) 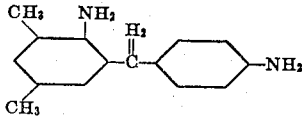
2 : 2'-diamino-diphenyl-methane (2) 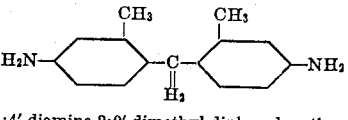
2 : 4-diamino-diphenyl-methane (3) 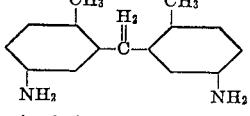
3 : 3'-diamino-diphenyl-methane (4) 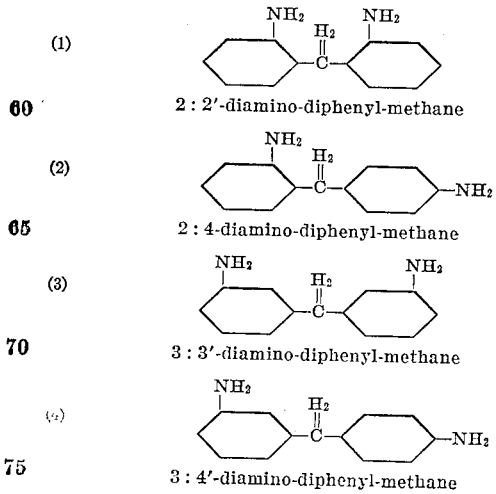
3 : 4'-diamino-diphenyl-methane (5) 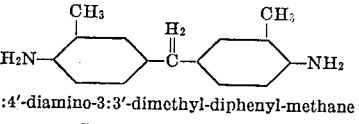
2:4'-diamino-3:5-dimethyl-diphenyl-methane (6) 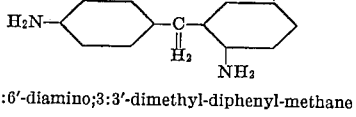
4:4'-diamino-2:2'-dimethyl-diphenyl-methane (7) 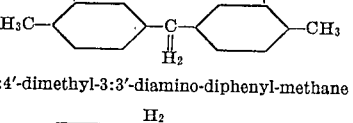
5:5'-diamino-2:2'-dimethyl-diphenyl-methane (8) 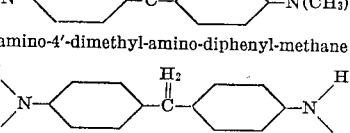
4:4'-diamino-3:3'-dimethyl-diphenyl-methane (9) 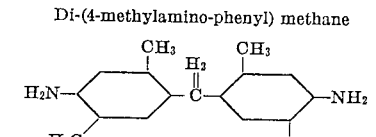
4:6'-diamino-3:3'-dimethyl-diphenyl-methane

(10) 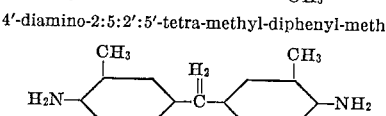
4:4'-dimethyl-3:3'-diamino-diphenyl-methane

(11) 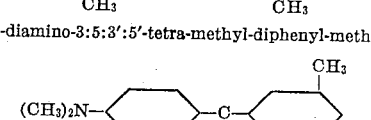
4-amino-4'-dimethyl-amino-diphenyl-methane

(12) 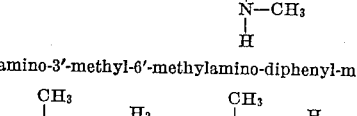
Di-(4-methylamino-phenyl) methane

(13) 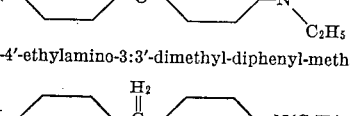
4:4'-diamino-2:5:2':5'-tetra-methyl-diphenyl-methane

(14) 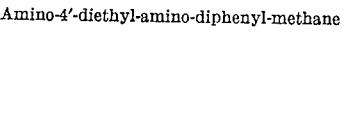
4:4'-diamino-3:5:3':5'-tetra-methyl-diphenyl-methane

(15) 
4-Dimethylamino-3'-methyl-6'-methylamino-diphenyl-methane

(16) 
4-amino-4'-ethylamino-3:3'-dimethyl-diphenyl-methane

(17) 
4-Amino-4'-diethyl-amino-diphenyl-methane

(18) 2-Amino-4'-dimethylamino-3:5-dimethyl-diphenyl-methane

(19) 3:3'-dimethyl-amino-diphenyl-methane

(20) 4-Methyl-amino-4'-dimethylamino-3-methyl-diphenyl-methane

(21) 4:4'-methylamino-2:2'-methyl-diphenyl-methane

(22) Di-(4-ethylamino-phenyl)-methane

(23) Di-(4-ethylamino-3-methyl-phenyl)-methane

(24) 2-Amino-4'-diethylamino; 3:5-dimethyl-diphenyl-methane

(25) 4-Methyl-amino-4'-diethylamino-3-methyl-diphenyl-methane

(26) Di-(4-diethylamino-phenyl)-methane

(27) 4-Dimethyl-amino-4'-diethyl-amino-diphenyl-methane

(28) 4-Dimethyl-amino-4'-phenyl-amino-diphenyl-methane

(29) 2:2'-methyl-4:4'-dimethyl-amino-diphenyl-methane

(30) 2-Methyl-4:4'-dimethyl-amino-3'-methyl-diphenyl-methane

(31) 2:3'-methyl-4:6'-dimethyl-amino-diphenyl-methane

(32) 3:3'-methyl-4:6'-dimethylamino-diphenyl-methane

(33) 3:3'-methyl-6:6'-dimethylamino-diphenyl-methane

(34) 3:3'-methyl-4:4'-dimethylamino-diphenyl-methane

(35) 4:4'-methyl-ethyl-amino-diphenyl-methane

(36) a-b-Di (4-amino-phenyl) ethane

(37) a-b-Di (2-amino-phenyl) ethane

(38) a-a-Di (4-dimethyl-amino-phenyl) ethane

(39) a-b-Di (4-dimethyl-amino-phenyl) ethane

(40) b-b'-Di (4-dimethyl-amino-phenyl) propane

(41) a-Gamma-di (2-dimethyl-amino-phenyl) propane

(42) a-a-Di (4-dimethyl-amino-phenyl) propane

(43) 3:4'-di (dimethylamino) triphenyl-methane

(44) H₂N—⟨⟩—C(CH₃)(CH₃)—⟨⟩—NH₂ p-p'-diamino-diphenyl-dimethyl-methane

(45) H₂N—⟨⟩—C(CH₃)(C₂H₅)—⟨⟩—NH₂ p-p'-diamino-diphenyl-methyl-ethyl-methane

(46) H₂N—⟨⟩(CH₃)—C(CH₃)(CH₃)—⟨⟩(CH₃)—NH₂ p-p'-diamino-di-o-tolyl-dimethyl-methane

(47) H₂N—⟨⟩(OCH₃)—C(CH₃)(CH₃)—⟨⟩(OCH₃)—NH₂ p-p'-diamino-di-o-anisyl-dimethyl-methane

(48) H₂N—⟨⟩(OC₂H₅)—C(CH₃)(CH₃)—⟨⟩(OC₂H₅)—NH₂ p-p'-diamino-di-o-phenetidyl-dimethyl-methane

(49) H₂N—⟨⟩—CH₂—⟨⟨⟩⟩—OH 4-amino-phenyl (4-hydroxy'-naphthyl) methane

(50) (CH₃)₂N—⟨⟩(OH)—CH—⟨⟩(OH)—N(CH₃)₂

4:4'-di (dimethylamino)-3:3'-dihydroxy-diphenyl-methane

(51) H₅C₂(H)N—⟨⟩(OH)(CH₃)—CH₂—⟨⟩(OH)(CH₃)—N(H)C₂H₅

Di (ethyl-amino-hydroxy-tolyl) methane

The methods of preparation of compounds of the type indicated above are not a part of the present invention and since such methods are fully described in the literature and will be obvious to any chemist skilled in the art, it seems superfluous to describe them here.

Many other compounds falling within the general class described herein, and which exhibit similar anti-aging properties could be named. The particular compounds indicated above are mentioned merely by way of example. It will be obvious from the above examples that the phenyl groups may contain alkyl, hydroxy and alkoxy substituents without materially altering the value of the compounds as antioxidants. Of the various sub-types, those compounds containing two unsubstituted amino groups are preferred and of this class in particular p-p'-diamino-diphenyl-methane represents the preferred embodiment.

The antioxidants described above may be incorporated into the rubber by any well known means, such as by milling them into the stock upon the rolls of an ordinary mill. Moreover, they can be successfully employed in various rubber compounds and rubber substitutes, such as, for example, gutta percha, balata, and synthetic rubber, and it is therefore to be understood that the invention is not limited to any particular rubber stock or rubber compound.

Also, the proportions of the antioxidant employed may be varied within wide limits depending upon the stock treated and the conditions to be met in use, although under ordinary circumstances from 1 to 5% of the antioxidant based on the weight of the rubber has been found to be highly satisfactory.

While we prefer to use the antioxidants of this type by adding the antioxidant to the rubber mix prior to vulcanization, it is also possible to use them for the treatment of vulcanized rubber. In such cases the rubber may be impregnated by either dissolving the antioxidant in a solvent, or by employing it in vapor form.

As many apparent and widely different embodiments of this invention may be made without departing from the spirit thereof, it is to be understood that we do not limit ourselves to the foregoing examples or description except as indicated in the following claims.

We claim:

1. The process of increasing the resistance of rubber to deterioration which comprises incorporating with the rubber a compound having the general formula

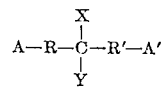

wherein A and A' represent amino groups or alkyl or dialkyl substituted amino groups, R and R' represent aryl groups at least one of which contains a hydroxy or alkoxy group, and X and Y represent H or an alkyl or aryl hydrocarbon substituent.

2. The process of increasing the resistance of rubber to deterioration which comprises incorporating with the rubber a compound having the general formula

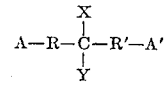

wherein A and A' represent amino groups or alkyl or dialkyl substituted amino groups, R and R' represent aryl groups both of which contain a hydroxy or alkoxy group, and X and Y represent H or an alkyl or aryl hydrocarbon substituent.

3. The process of increasing the resistance of rubber to deterioration which comprises incorporating with the rubber a compound having the general formula

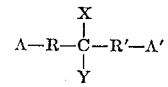

wherein A and A' represent amino groups or alkyl or dialkyl substituted amino groups, R and R' represent phenyl groups at least one of which contains a hydroxy or alkoxy group, and X and Y represent H or an alkyl or aryl hydrocarbon substituent.

4. The process of increasing the resistance of rubber to deterioration which comprises incorporating with the rubber a compound having the general formula

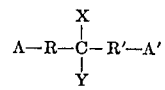

wherein A and A' represent amino groups or alkyl or dialkyl substituted amino groups, R and R' represent phenyl groups both of which contain a hydroxy or alkoxy group, and X and Y represent H or an alkyl or aryl hydrocarbon substituent.

5. The process of increasing the resistance of rubber to deterioration which comprises incorporating with the rubber a compound having the general formula

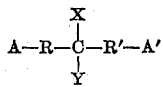

wherein A and A' represent amino groups or alkyl or dialkyl substituted amino groups, R and R' represent aryl groups at least one of which contains a hydroxy or alkoxy group, and X and Y represent alkyl substituents.

6. The process of increasing the resistance of rubber to deterioration which comprises incorporating with the rubber a compound having the general formula

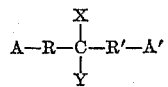

wherein A and A' represent amino groups or alkyl or dialkyl substituted amino groups, R and R' represent aryl groups both of which contain a hydroxy or alkoxy group, and X and Y represent alkyl substituents.

7. The process of increasing the resistance of rubber to deterioration which comprises incorporating with the rubber a compound having the general formula

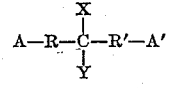

wherein A and A' represent amino groups or alkyl or dialkyl substituted amino groups, R and R' represent phenyl groups at least one of which contains a hydroxy or alkoxy group, and X and Y represent alkyl substituents.

8. The process of increasing the resistance of rubber to deterioration which comprises incorporating with the rubber a compound having the general formula

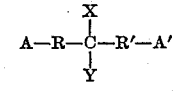

wherein A and A' represent amino groups or alkyl or dialkyl substituted amino groups, R and R' represent phenyl groups both of which contain a hydroxy or alkoxy group, and X and Y represent alkyl substituents.

9. The process of increasing the resistance of rubber to deterioration which comprises incorporating with the rubber a compound having the general formula

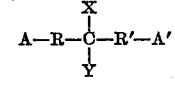

wherein A and A' represent amino groups or alkyl or dialkyl substituted amino groups, R and R' represent aryl groups, and X and Y represent alkyl substituents.

10. Rubber having incorporated therein a small amount of a compound having the general formula

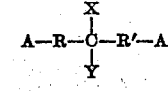

wherein A and A' represent amino groups or alkyl or dialkyl substituted amino groups, R and R' represent aryl groups at least one of which contains a hydroxy or alkoxy group, and X and Y represent H or an alkyl or aryl hydrocarbon substituent.

11. Rubber having incorporated therein a small amount of a compound having the general formula

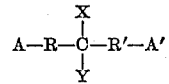

wherein A and A' represent amino groups or alkyl or dialkyl substituted amino groups, R and R' represent aryl groups both of which contain a hydroxy or alkoxy group, and X and Y represent H or an alkyl or aryl hydrocarbon substituent.

12. Rubber having incorporated therein a small amount of a compound having the general formula

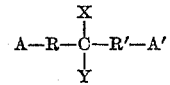

wherein A and A' represent amino groups or alkyl or dialkyl substituted amino groups, R and R' represent phenyl groups at least one of which contains a hydroxy or alkoxy group, and X and Y represent H or an alkyl or aryl hydrocarbon substituent.

13. Rubber having incorporated therein a small amount of a compound having the general formula

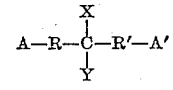

wherein A and A' represent amino groups or alkyl or dialkyl substituted amino groups, R and R' represent phenyl groups both of which contain a hydroxy or alkoxy group, and X and Y represent H or an alkyl or aryl hydrocarbon substituent.

14. Rubber having incorporated therein a small amount of a compound having the general formula

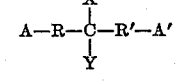

wherein A and A' represent amino groups or alkyl or dialkyl substituted amino groups, R and R' represent aryl groups at least one of which contains a hydroxy or alkoxy group, and X and Y represent alkyl substituents.

15. Rubber having incorporated therein a small amount of a compound having the general formula

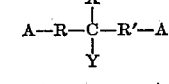

wherein A and A' represent amino groups or alkyl or dialkyl substituted amino groups, R and R' represent aryl groups both of which contain a hydroxy or alkoxy group, and X and Y represent alkyl substituents.

16. Rubber having incorporated therein a small amount of a compound having the general formula

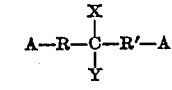

wherein A and A' represent amino groups or alkyl or dialkyl substituted amino groups, R and R' represent phenyl groups at least one of which contains a hydroxy or alkoxy group, and X and Y represent alkyl substituents.

17. Rubber having incorporated therein a small amount of a compound having the general formula

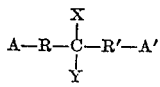

wherein A and A' represent amino groups or alkyl or dialkyl substituted amino groups, R and R' represent phenyl groups both of which contain a hydroxy or alkoxy group, and X and Y represent alkyl substituents.

18. Rubber having incorporated therein a small amount of a compound having the general formula

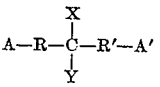

wherein A and A' represent amino groups or alkyl or dialkyl substituted amino groups, R and R' represent aryl groups, and X and Y represent alkyl substituents.

19. Rubber having incorporated therein a small amount of a compound having the general formula

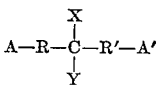

wherein A and A' represent amino groups or alkyl or dialkyl substituted amino groups, R and R' represent aryl groups at least one of which contains an alkoxy group, and X and Y represent H or an alkyl or aryl hydrocarbon substituent.

20. Rubber having incorporated therein a small amount of a compound having the general formula

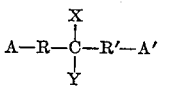

wherein A and A' represent amino groups or alkyl or dialkyl substituted amino groups, R and R' represent aryl groups both of which contain an alkoxy group, and X and Y represent H or an alkyl or aryl hydrocarbon substituent.

21. Rubber having incorporated therein a small amount of a compound having the general formula

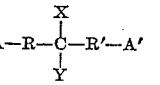

wherein A and A' represent amino groups or alkyl or dialkyl substituted amino groups, R and R' represent phenyl groups at least one of which contains an alkoxy group, and X and Y represent H or an alkyl or aryl hydrocarbon substituent.

22. Rubber having incorporated therein a small amount of a compound having the general formula

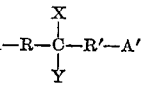

wherein A and A' represent amino groups or alkyl or dialkyl substituted amino groups, R and R' represent phenyl groups both of which contain an alkoxy group, and X and Y represent H or an alkyl or aryl hydrocarbon substituent.

23. Rubber having incorporated therein a small amount of a compound having the general formula

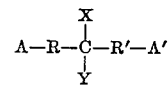

wherein A and A' represent amino groups or alkyl or dialkyl substituted amino groups, R and R' represent aryl groups at least one of which contains an alkoxy group, and X and Y represent alkyl substituents.

24. Rubber having incorporated therein a small amount of a compound having the general formula

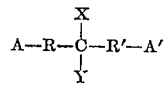

wherein A and A' represent amino groups or alkyl or dialkyl substituted amino groups, R and R' represent aryl groups both of which contain an alkoxy group, and X and Y represent alkyl substituents.

25. Rubber having incorporated therein a small amount of a compound having the general formula

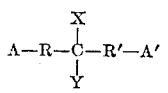

wherein A and A' represent amino groups or alkyl or dialkyl substituted amino groups, R and R' represent phenyl groups at least one of which contains an alkoxy group, and X and Y represent alkyl substituents.

26. Rubber having incorporated therein a small amount of a compound having the general formula

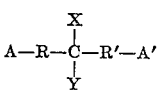

wherein A and A' represent amino groups or alkyl or dialkyl substituted amino groups, R and R' represent phenyl groups both of which contain an alkoxy group, and X and Y represent alkyl substituents.

27. Rubber having incorporated therein a small amount of a compound having the general formula

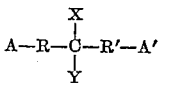

wherein A and A' represent amino groups or alkyl or dialkyl substituted amino groups, R and R' represent aryl groups at least one of which contains a hydroxy or alkoxy group, and X and Y represent methyl groups.

28. Rubber having incorporated therein a small amount of a compound having the general formula

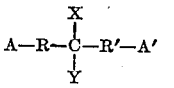

wherein A and A' represent amino groups or alkyl or dialkyl substituted amino groups, R and R' represent aryl groups both of which contain a hydroxy or alkoxy group, and X and Y represent methyl groups.

29. Rubber having incorporated therein a small amount of a compound having the general formula

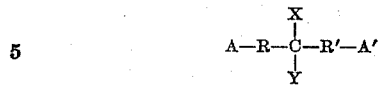

wherein A and A' represent amino groups or alkyl or dialkyl substituted amino groups, R and R' represent phenyl groups at least one of which contains a hydroxy or alkoxy group, and X and Y represent methyl groups.

30. Rubber having incorporated therein a small amount of a compound having the general formula

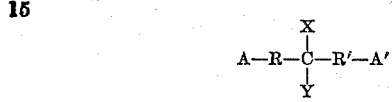

wherein A and A' represent amino groups or alkyl or dialkyl substituted amino groups, R and R' represent phenyl groups both of which contain a hydroxy or alkoxy group, and X and Y represent methyl groups.

31. Rubber having incorporated therein a small amount of a compound having the general formula

wherein A and A' represent amino groups or alkyl or dialkyl substituted amino groups, R and R' represent aryl groups, and X and Y represent methyl groups.

32. Rubber having incorporated therein a small amount of a compound having the general formula

wherein A and A' represent amino groups or alkyl or dialkyl substituted amino groups, R and R' represent aryl groups at least one of which contains an alkoxy group, and X and Y represent methyl groups.

33. Rubber having incorporated therein a small amount of a compound having the general formula

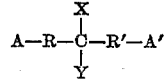

wherein A and A' represent amino groups or alkyl or dialkyl substituted amino groups, R and R' represent aryl groups both of which contain an alkoxy group, and X and Y represent methyl groups.

34. Rubber having incorporated therein a small amount of a compound having the general formula

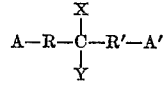

wherein A and A' represent amino groups or alkyl or dialkyl substituted amino groups, R and R' represent phenyl groups at least one of which contains an alkoxy group, and X and Y represent methyl groups.

35. Rubber having incorporated therein a small amount of a compound having the general formula

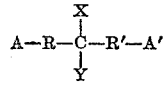

wherein A and A' represent amino groups or alkyl or dialkyl substituted amino groups, R and R' represent phenyl groups both of which contain an alkoxy group, and X and Y represent methyl groups.

36. Rubber having incorporated therein a small amount of p-p'-diamino-di-o-anisyl-dimethyl-methane.

37. Rubber having incorporated therein a small amount of 4:4'-di(dimethyl-amino)-3:3'-dihydroxy-diphenyl-methane.

38. Rubber having incorporated therein a small amount of di(ethyl-amino-hydroxy-tolyl)-methane.

WILLIAM S. CALCOTT.
WILLIAM A. DOUGLASS.